(12) United States Patent
Sung et al.

(10) Patent No.: US 8,619,783 B2
(45) Date of Patent: Dec. 31, 2013

(54) SYSTEM AND METHOD FOR COUPLING COMMUNICATION TERMINALS

(75) Inventors: Nak-Woon Sung, Daejeon (KR); Sook-Jin Lee, Daejeon (KR); Jee-Hwan Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 12/971,245

(22) Filed: Dec. 17, 2010

(65) Prior Publication Data

US 2011/0149859 A1 Jun. 23, 2011

(30) Foreign Application Priority Data

Dec. 18, 2009 (KR) .................. 10-2009-0127061
Jul. 6, 2010 (KR) .................. 10-2010-0064859

(51) Int. Cl.
*H04L 12/56* (2011.01)

(52) U.S. Cl.
USPC ............ 370/394; 370/390; 370/396; 370/328

(58) Field of Classification Search
USPC .................. 370/328, 390, 394, 396
See application file for complete search history.

(56) References Cited

U.S. PATENT DOCUMENTS 6,160,808 A * 12/2000 Maurya .................. 370/389
2009/0073916 A1 * 3/2009 Zhang et al. ............. 370/315

FOREIGN PATENT DOCUMENTS

| JP | 2004-248132 | 9/2004 |
| KR | 10-2009-0029240 | 3/2009 |
| KR | 10-2009-0071299 | 7/2009 |
| KR | 10-2009-0080742 | 7/2009 |

* cited by examiner

*Primary Examiner* — Omer Mian
(74) *Attorney, Agent, or Firm* — Staas & Halsey LLP

(57) ABSTRACT

Disclosed herein is a system and method for coupling communication terminals. In a communication method performed by a terminal coupler according to the present invention, sequence numbers are sequentially assigned to data packets received from a terminal end device. The data packets with the sequence numbers assigned thereto are individually transferred to a plurality of communication terminals belonging to a same group in conformity with preset scheduling policies. Data packets, received from the plurality of communication terminals belonging to the same group, are reordered by sequence numbers, and the reordered data packets are transferred to the terminal end device.

2 Claims, 12 Drawing Sheets

SYSTEM AND METHOD FOR COUPLING COMMUNICATION TERMINALS

CROSS REFERENCE TO RELATED APPLICATIONS

This application claims the benefit of Korean Patent Application Nos. 10-2009-0127061, filed on Dec. 18, 2009 and 10-2010-0064859, filed on Jul. 6, 2010, which are hereby incorporated by reference in their entireties into this application.

BACKGROUND OF THE INVENTION

1. Technical Field

The present invention relates generally to a system and method for coupling communication terminals in a mobile communication system. More particularly, the present invention relates to a system and method, which can provide a high-speed/high-capacity data service to the user of a terminal end device such as a notebook computer in a wireless communication environment by connecting a plurality of communication terminals, which can be independently connected to a base station by mobile communication, to a single terminal coupler.

2. Description of the Related Art

Conventional 3rd-Generation (3G) or 4G communication systems are intended to provide high-speed data services through wireless channels which are limited resources by using various types of excellent technologies such as Orthogonal Frequency Division Multiplexing (OFDM) and Multiple-Input Multiple-Output (MIMO). Further, conventional 3G or 4G communication systems are intended to provide high-speed data services by allowing a single terminal to be simultaneously connected to a plurality of carriers.

Korean Patent Publication No. 2009-0071299 discloses a technology entitled "Apparatus and method for transmitting/receiving information about changes in groups of mobile terminals in a communication system". This patent describes a scheme for transmitting/receiving information about changes in groups of mobile terminals in a communication system, wherein mobile terminals are divided into at least two groups, and individual groups communicate with each other using different frequency bands.

Further, Korean Patent Publication No. 2009-0080742 discloses a technology entitled "Communication terminal device and method of performing communication using a plurality of network interfaces installed in the communication terminal device". This patent describes a scheme which respectively allocates different Internet Protocol (IP) addresses corresponding to a plurality of network interfaces to a plurality of applications of the communication terminal device, relays data that is transmitted or received between the plurality of applications and the plurality of network interfaces on the basis of the allocated IP addresses, and allows the network interfaces to simultaneously communicate with an external network via the relay, thus improving the transfer efficiency of data.

However, even if the above technologies are used, the maximum transfer rate that can be supported by one terminal is more limited in a wireless communication environment compared to a wired communication environment, and may also vary according to the status of a wireless channel.

That is, under the current Internet use environment and the current wireless communication environment in which the amount of multimedia data is rapidly increasing, there are many difficulties when a user is provided with a high-speed/high-capacity data service using only a single terminal.

SUMMARY OF THE INVENTION

Accordingly, the present invention has been made keeping in mind the above problems occurring in the prior art, and an object of the present invention is to provide a system and method that connects a plurality of communication terminals to a single terminal coupler, and provides a high-speed/high-capacity data service which is difficult to be supported by a single terminal due to factors such as the status of a wireless channel or the amount of data.

Another object of the present invention is to provide a service, which cannot be supported by a single terminal due to the inferior status of a wireless channel, via a plurality of to communication terminals.

A further object of the present invention is to provide the functions of allowing a transmission stage to assign sequence numbers to respective data packets and allowing a reception stage to reorder the data packets by the sequence numbers and to transfer the reordered data packets to a subsequent layer so that a single terminal end device and a base station can perform group-based communication by using the communication channels of a plurality of terminals.

In accordance with an aspect of the present invention to accomplish the above objects, there is provided a terminal coupler, including a sequence number assignment unit for performing processing such that sequence numbers are sequentially assigned to data packets received from a terminal end device, and the data packets with the sequence numbers assigned thereto are individually transferred to a plurality of communication terminals belonging to a same group in conformity with preset scheduling policies; and a packet transfer unit for reordering the data packets, received from the plurality of communication terminals belonging to the same group, by the sequence numbers included in the data packets, and transferring the reordered data packets to the terminal end device.

Preferably, the terminal coupler may further include a communication unit for setting up a plurality of communication channels between the terminal end device and the base station using the plurality of communication terminals, and the communication unit may be configured such that, when a new communication terminal is connected to the terminal coupler, the communication unit requests the new communication terminal to set up a connection with a base station, thus enabling a connection between the new communication terminal and the base station to be set up.

Preferably, the terminal coupler may further include a control unit for determining whether the new terminal is a communication terminal connected first to the terminal coupler in the group after the connection between the new communication terminal and the base station has been set up.

Preferably, the control unit may perform processing such that if it is determined that the new communication terminal is not a communication terminal connected first to the terminal coupler, a group join request message including a group identifier of the group is sent to the new communication terminal.

Preferably, the control unit may perform processing such that if it is determined that the new communication terminal is a communication terminal connected first to the terminal coupler, the terminal end device is assigned an Internet Protocol (EP) address by the base station via the new communication terminal.

Preferably, the control unit may perform processing such that a group create request message including an identifier required to create a new group is sent to the new communication terminal.

In accordance with another aspect of the present invention to accomplish the above objects, there is provided a base station, including a terminal group management unit for managing a plurality of communication terminals connected to a specific terminal coupler as a single group; a packet transfer unit for reordering data packets, received from a plurality of communication terminals connected to the terminal coupler and belonging to a same group, by sequence numbers, and transferring the reordered data packets to an external network; and a sequence number assignment unit for performing processing such that data packets to be transmitted to the terminal coupler are received from the external network, sequence numbers are sequentially assigned to the data packets, and the data packets with the sequence numbers assigned thereto are transferred to the plurality of communication terminals belonging to the same group in conformity with preset scheduling policies.

Preferably, the terminal group management unit may assign a same group identifier to the plurality of communication terminals connected to the terminal coupler, and sets the communication terminals to the same group.

Preferably, the terminal group management unit may determine whether to create a new group or whether to add a relevant communication terminal to a specific group by using a Group Identifier (GID) field included in a traffic connection request message received from the communication terminal.

Preferably, the terminal group management unit may add a group identifier (GID) field to a traffic connection response message, and include a group identifier of a newly created group or a group identifier of a group, to which the communication terminal has been added, in the added GID field when the traffic connection response message is sent to the communication terminal in response to the traffic connection request message.

Preferably, the terminal group management unit may release a traffic connection with the communication terminal and deletes registration of the communication terminal from the group when a traffic connection release request message is received from the communication terminal connected to the terminal coupler.

In accordance with a further aspect of the present invention to accomplish the above objects, there is provided a communication method performed by a terminal coupler, including sequentially assigning sequence numbers to data packets received from a terminal end device; individually transferring the data packets with the sequence numbers assigned thereto to a plurality of communication terminals belonging to a same group in conformity with preset scheduling policies; and reordering data packets, received from the plurality of communication terminals belonging to the same group, by sequence numbers and transferring the reordered data packets to the terminal end device.

Preferably, the communication method may further include setting up a plurality of communication channels between the terminal end device and a base station via the plurality of communication terminals.

Preferably, the setting up the communication channels may include when a new communication terminal is connected to the terminal coupler, requesting the new communication terminal to set up a connection with the base station, thus enabling a connection between the new communication terminal and the base station to be set up; and after the connection between the new communication terminal and the base station has been set up, determining whether the new communication terminal is a terminal connected first to the terminal coupler.

Preferably, the communication method may further include, if it is determined that the new communication terminal is not a communication terminal connected first to the terminal coupler, sending a group join request message, which includes an identifier of the relevant group, to the new communication terminal.

Preferably, the communication method may further include, if it is determined that the new communication terminal is a communication terminal connected first to the terminal coupler, performing processing such that the terminal end device is assigned an IP address by the base station using the new communication terminal.

Preferably, the communication method may further include sending a group create request message, which includes a group identifier required to create a group, to the new communication terminal; and receiving the group identifier of the group created in response to the group create request from the new communication terminal.

In accordance with yet another aspect of the present invention to accomplish the above objects, there is provided a communication method performed by a base station, including reordering data packets received from a plurality of terminals connected to a specific terminal coupler and belonging to a same group, by sequence numbers, and transferring the reordered data packets to an external network; receiving data packets to be transmitted to the terminal coupler from the external network, and sequentially assigning sequence numbers to the data packets; and individually transferring the data packets with the sequence numbers assigned thereto to the plurality of terminals belonging to the same group in conformity with preset scheduling policies.

Preferably, the communication method may further include setting the plurality of communication terminals connected to the terminal coupler to the same group by assigning a same group identifier to the communication terminals.

Preferably, the setting the communication terminals to the same group may include determining whether to add a relevant communication terminal to the group by using a group identifier (GID) field included in a traffic connection request message received from the communication terminal.

Accordingly, the present invention has the following advantages.

With regard to a high-speed/high-capacity data service that is difficult to be supported by one communication terminal due to factors such as the status of wireless channels or the amount of data, a plurality of communication terminals is connected to one terminal coupler, and thus a user can easily be provided with that service.

That is, the present invention can provide a stable data service to an area in which the status of wireless channels is not good, and can provide a high-capacity multimedia service, which cannot be supported by a single terminal, at high speed to an area in which the status of wireless channels is good.

Further, the present invention is advantageous in that even a terminal equipped with no wireless communication means can be stably provided with a desired service via wireless communication by using a terminal coupler according to the present invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
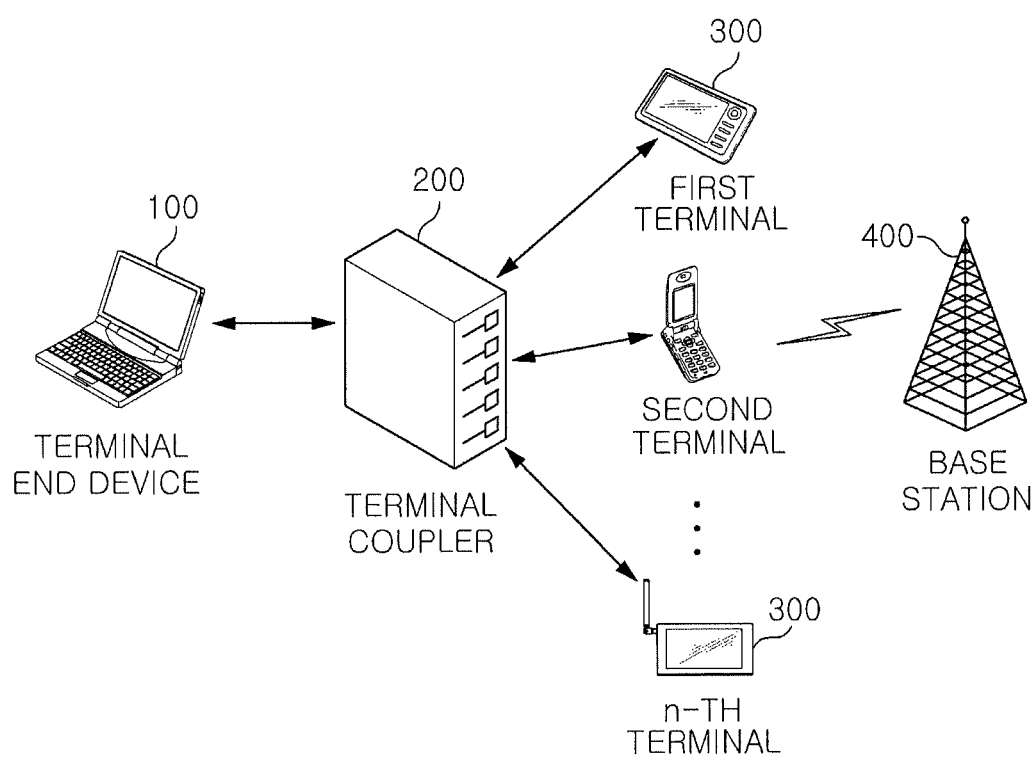
FIG. 1 is a diagram showing a system for coupling communication terminals in a mobile communication system according to the present invention.

Hereinafter, embodiments of the present invention will be described in detail with reference to the attached drawings. If in the specification, detailed descriptions of well-known functions or configurations may unnecessarily make the gist of the present invention obscure, the detailed descriptions will be omitted, and repetitive descriptions will also be omitted. The embodiments of the present invention are provided to more completely describe the present invention to those skilled in the art. Therefore, the shapes and sizes of components in the drawings may be exaggerated to make the descriptions clearer.

FIG. 1 is a diagram showing a system for coupling communication terminals in a mobile communication system according to the present invention.

Referring to FIG. 1, the communication terminal coupling system according to the present invention includes a terminal end device 100, a terminal coupler 200, terminals 300, and a base station 400.

The terminal end device 100 is connected to the single terminal coupler 200 in a wired (or wireless) manner, and may be a mobile terminal such as a notebook computer or a Portable Multimedia Player (PMP).

The terminal coupler 200 is connected to the plurality of terminals 300, which can perform mobile communication with the base station 400, in a wired (or wireless) manner.

Each of the terminals 300 is connected to the base station 400 over a mobile communication network. In this case, the terminal coupler 200 does not interfere with the operations of the terminals 300, and each terminal 300 is operated independently.

The terminals 300 applied to the present invention may be any terminals (for example, mobile phones) as long as they can communicate with the base station over the mobile communication network.

Figure 2:
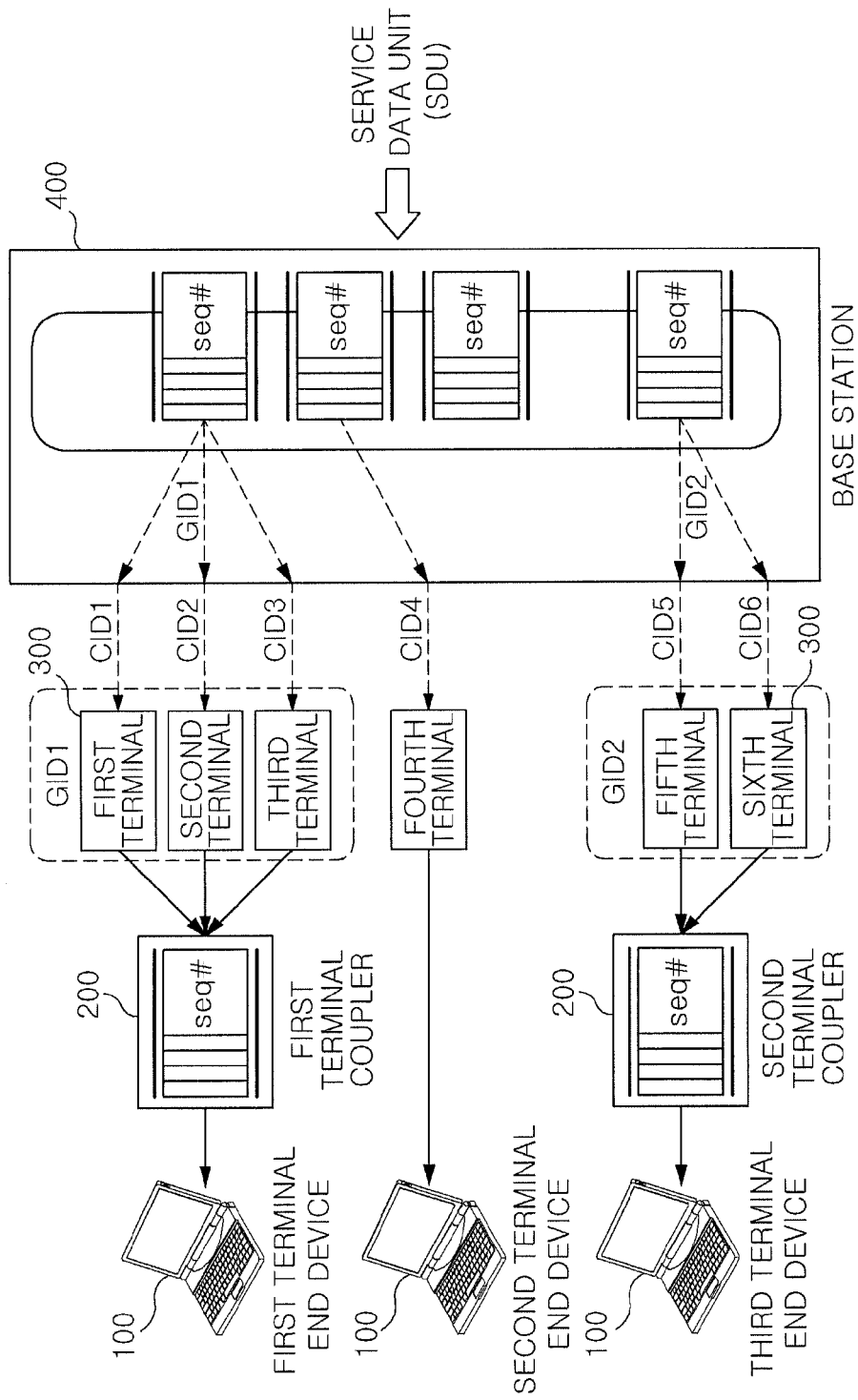
FIG. 2 is a diagram showing a packet service provided by a terminal coupler according to the present invention.

FIG. 2 is a diagram showing a packet service provided by the terminal coupler according to the present invention.

FIG. 2 shows that a first terminal end device is connected to a first terminal coupler and performs packet communication with a base station 400 using three terminals (a first terminal, a second terminal, and a third terminal).

Further, the drawing shows that a third terminal end device is connected to a second terminal coupler and performs packet communication with the base station 400 using two terminals (fifth and sixth terminals).

Meanwhile, the drawing shows that a second terminal end device performs packet communication with the base station using one terminal (a fourth terminal) without using any terminal coupler.

In FIG. 2, each terminal 300 sets up a communication connection with the base station 400 to provide a packet service between a corresponding terminal coupler 200 and the base station 400. A unique Connection Identifier (CID) is assigned to each connection by the base station 400. In this case, when a terminal coupler 200 is not present between the terminal end device 100 and each terminal 300, the base station 400 transmits each Service Data Unit (SDU) packet to the terminal 300 without separately processing the SDU packet. Similarly, the terminal 300 also transmits each data packet to the base station 400 without separately processing the data packet.

Meanwhile, in the case of terminals 300 connected to a single terminal end device 100 through a corresponding terminal coupler 200, the base station 400 manages the terminals 300 by setting the terminals as a single group.

For example, the first terminal coupler is connected to the first, second, and third terminals. Unique connection identifiers CID1, CID2, and CID3 are assigned to the connections between the respective terminals and the base station. Further, a single group identifier GID1 is assigned to the connection identifiers CID1, CID2, and CID3.

The group identifier GID is applied in common to a plurality of terminals connected to a single terminal coupler, and is used as a means for identifying each group when a plurality of groups is created.

The terminal end device 100 is assigned an FP address by the base station 400 by performing a Dynamic Host Configuration Protocol (DHCP) procedure with the base station 400 using a terminal connected first to the terminal coupler 200.

This IP address is shared later among all terminals belonging to a single terminal group. For example, an IP address assigned to the first terminal end device of FIG. 2 by the base station is shared among the first, second, and third terminals which have the same group identifier GID1.

Therefore, in the present invention, when data packets arrive at the terminal coupler 200, sequence numbers seq_num are sequentially assigned to the received data packets, and the data packets are transferred to a plurality of terminals connected to the terminal coupler 200 in conformity with preset scheduling policies.

The terminals that received the data packets from the terminal coupler 200 transmit the data packets to the base station 400. Therefore, the base station 400 receives the data packets from the plurality of terminals. In this case, the base station 400 reorders data packets received through connections belonging to the same group (that is, having the same GID) by the sequence numbers seq_num, and transmits the reordered data packets to an external network.

Meanwhile, when the base station 400 receives data packets from the external network, it checks the GID of packets corresponding to the IP address of the terminal end device 100, and transmits the data packets through connections of individual terminals belonging to the group with the GID.

Here, similarly to the terminal coupler 200, the base station 400 sequentially assigns sequence numbers seq_num to the data packets received from the external network, and individually transfers the data packets to the plurality of terminals belonging to a relevant group in conformity with preset scheduling policies. The individual terminals transmit the data packets received from the base station 400 to the terminal coupler 200. Then, the terminal coupler 200 receives the data packets from the plurality of terminals. In this case, the terminal coupler 200 reorders the received data packets by the sequence numbers seq_num, and transfers the reordered data packets to the terminal end device 100.

Meanwhile, as described above, a connection between the base station 400 and each terminal is identified by a unique CID.

Figure 3:
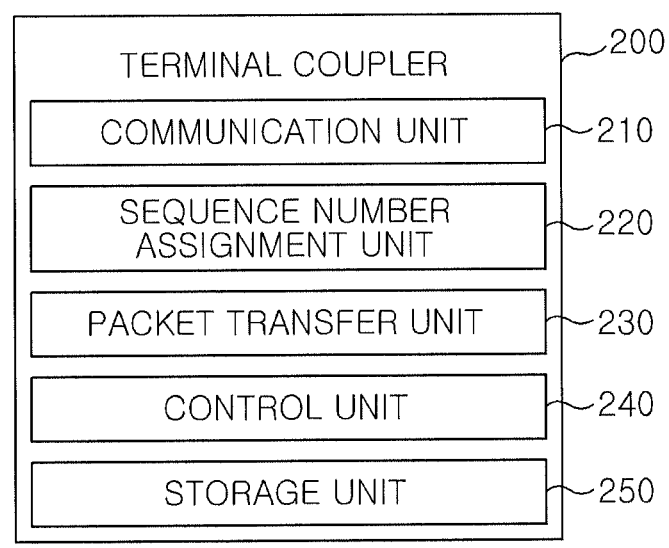
FIG. 3 is a diagram showing in detail the construction of the terminal coupler according to the present invention.

FIG. 3 is a diagram showing in detail the construction of the terminal coupler according to the present invention.

Referring to FIG. 3, the terminal coupler 200 according to the present invention includes a communication unit 210, a sequence number assignment unit 220, a packet transfer unit 230, a control unit 240, and a storage unit 250.

The communication unit 210 performs packet communication with a terminal end device, such as a notebook computer connected to the terminal coupler 200, and one or more communication terminals 300. For this operation, the communication unit 210 includes a communication interface that can be connected to the terminal end device, and a communication interface that can be connected to the communication terminals.

In more detail, the communication unit 210 sets up a plurality of communication channels between the terminal end device and the base station by using the plurality of communication terminals.

Further, when a new terminal is connected to the terminal coupler 200, the communication unit 210 requests the newly connected terminal to set up a connection with the base station, thus enabling a connection between the newly connected terminal and the base station to be set up.

The sequence number assignment unit 220 performs processing such that sequence numbers seq_num are sequentially assigned to the data packets received from the terminal end device, and such that the data packets with the sequence numbers assigned thereto are individually transferred to terminals belonging to the same group (that is, terminals having the same GID) in conformity with preset scheduling policies.

The packet transfer unit 230 reorders the data packets, received from the plurality of terminals belonging to the same group, by the sequence numbers included in the data packets, and transfers the reordered data packets to the terminal end device.

The control unit 240 individually transfers the data packets, to which the sequence numbers have been assigned by the sequence number assignment unit 220, to the plurality of terminals in conformity with the preset scheduling policies.

Here, the scheduling policies may be variably established depending on the communication environment and design environment. For example, the control unit 240 can differentially distribute data packets to a plurality of terminals depending on the transfer efficiencies and transfer rates of the respective terminals.

Further, when a new terminal is connected to the terminal coupler 200, and a connection between the new terminal and the base station is set up, the control unit 240 determines whether the new terminal is the terminal connected first to the terminal coupler 200.

If it is determined that the newly connected terminal is the terminal connected first to the terminal coupler 200, the control unit 240 performs processing such that a terminal end device can be assigned an IP address by the base station by performing a DHCP procedure using the newly connected terminal.

Further, the control unit 240 performs processing such that a group create request message, including an identifier required to create a new group, is sent to the newly connected communication terminal.

In contrast, if it is determined that the newly connected terminal is not the terminal connected first to the terminal coupler 200, the control unit 240 performs processing such that a group join request message, including a group identifier previously assigned using a terminal that was connected first to the terminal coupler 200, is sent to the newly connected terminal.

The storage unit 250 stores data and programs required to implement the present invention, and provides required data to the control unit 240 at the request of the control unit 240.

Figure 4:
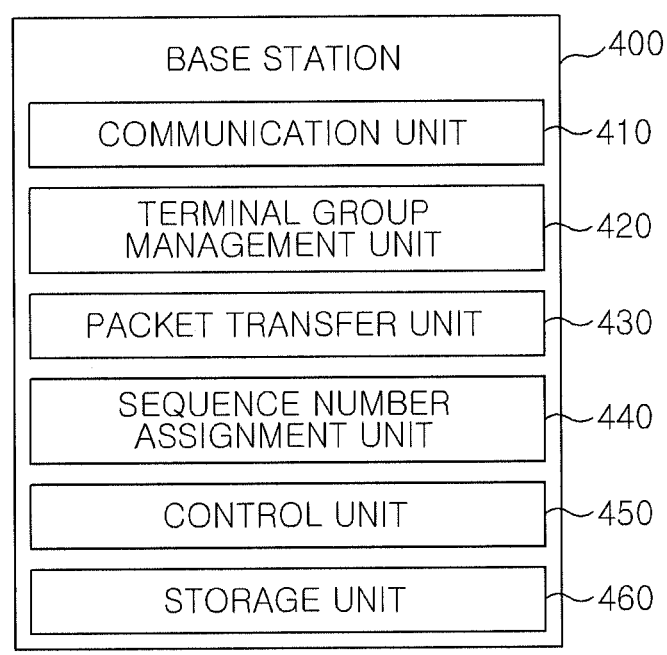
FIG. 4 is a diagram showing in detail the construction of a base station according to the present invention.

FIG. 4 is a diagram showing in detail the construction of the base station according to the present invention.

Referring to FIG. 4, the base station 400 according to the present invention includes a communication unit 410, a terminal group management unit 420, a packet transfer unit 430, a sequence number assignment unit 440, a control unit 450, and a storage unit 460.

The communication unit 410 performs packet communication with one or more communication terminals connected to a terminal coupler. The communication unit 410 sets up a plurality of communication channels between a terminal end device and the base station by using a plurality of communication terminals.

The terminal group management unit 420 manages the plurality of terminals connected to a specific terminal coupler as a single group.

In more detail, the terminal group management unit 420 assigns unique connection identifiers (CIDs) to the respective communication connections between the base station and the plurality of terminals, assigns a single group identifier (GID) to those connections, and then manages the plurality of terminals connected to the specific terminal coupler as a single group.

Further, the terminal group management unit 420 determines whether to create a new group or whether to add a relevant terminal to a specific group, using a group identifier field included in a traffic connection request message received from the terminal.

Furthermore, when transmitting a traffic connection response message to the terminal as a response to the traffic connection request message received from the terminal, the terminal group management unit 420 adds a GID field to the traffic connection response message, and enables the GID of a newly created group or the GID of the group, to which the relevant terminal has been added, to be included in the added GID field.

A procedure in which the terminal group management unit 420 determines, using a GID field, whether to create a new group or whether to add a relevant terminal to a specific group, and a procedure in which the terminal group management unit 420 adds a GID field to a traffic connection response message, enables the GID of the newly created group or the GID of the group to which the relevant terminal has been added, to be included in the added GID field, and sends the resulting traffic connection response message to the relevant terminal when sending the traffic connection response message to the relevant terminal, will be described in detail later.

The packet transfer unit 430 reorders the data packets received from the plurality of terminals, which are connected to a specific terminal coupler and belong to the same group, by the sequence numbers, and transfers the reordered data packets to an external network.

The sequence number assignment unit 400 performs processing such that it receives data packets to be transmitted to the terminal coupler from the external network, sequentially assigns sequence numbers seq_num to the data packets, and transfers the data packets with the sequence numbers assigned thereto to the plurality of terminals belonging to the same group (a set of terminals having the same GID), in conformity with preset scheduling policies.

The control unit 450 individually transfers the data packets, to which the sequence numbers have been assigned by the sequence number assignment unit 400, to the plurality of terminals in conformity with the preset scheduling policies.

Here, the scheduling policies may be variably established depending on the communication environment and design environment. For example, the control unit 450 can differentially distribute data packets to a plurality of terminals depending on the transfer efficiencies and transfer rates of the respective terminals.

The storage unit 460 stores data and programs required to implement the present invention, and provides required data to the control unit 450 at the request of the control unit 450.

Figure 5:
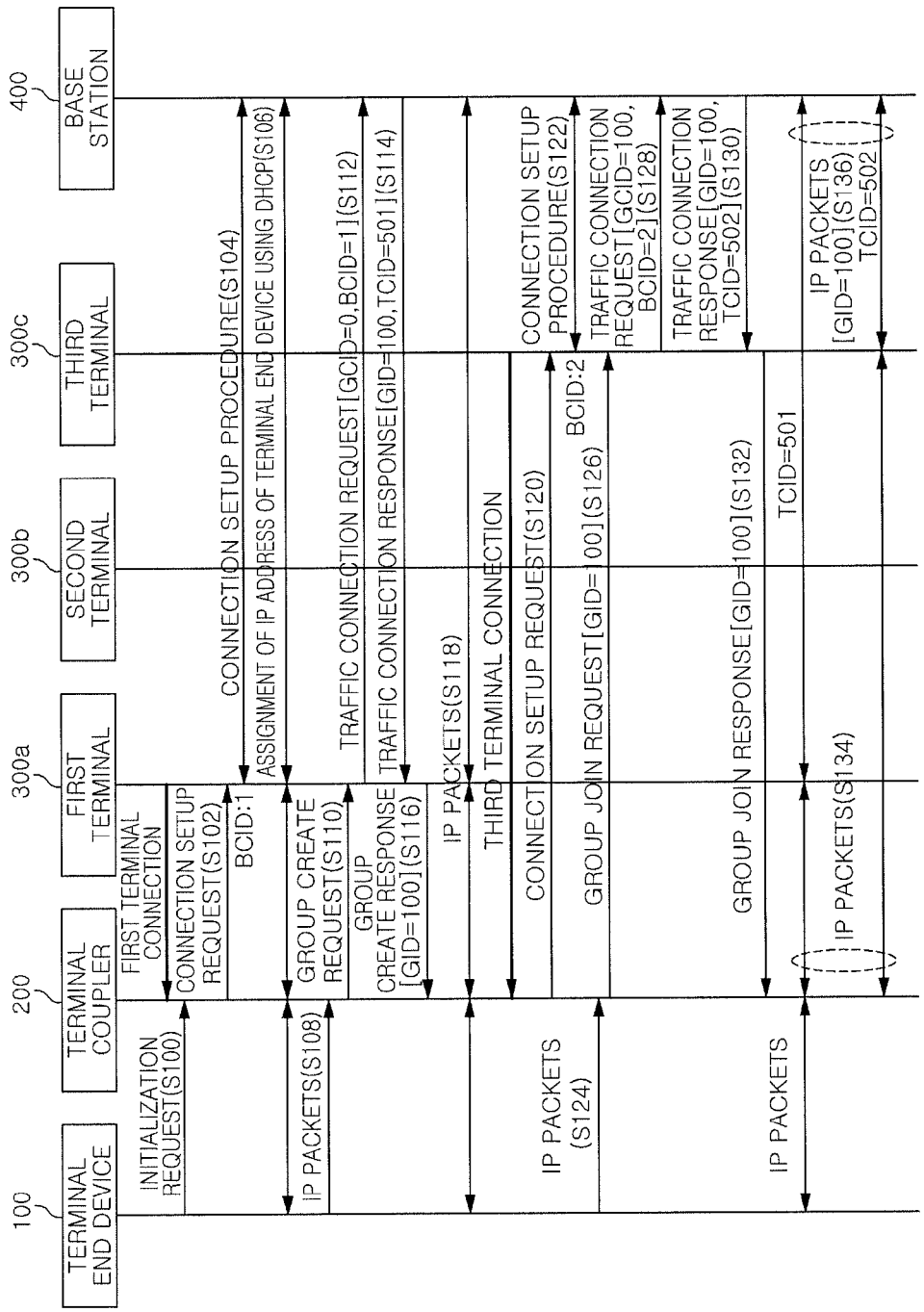
FIGS. 5 and 6 are flow diagrams showing a terminal connection processing method performed by the terminal coupler according to an embodiment of the present invention.
Figure 6:
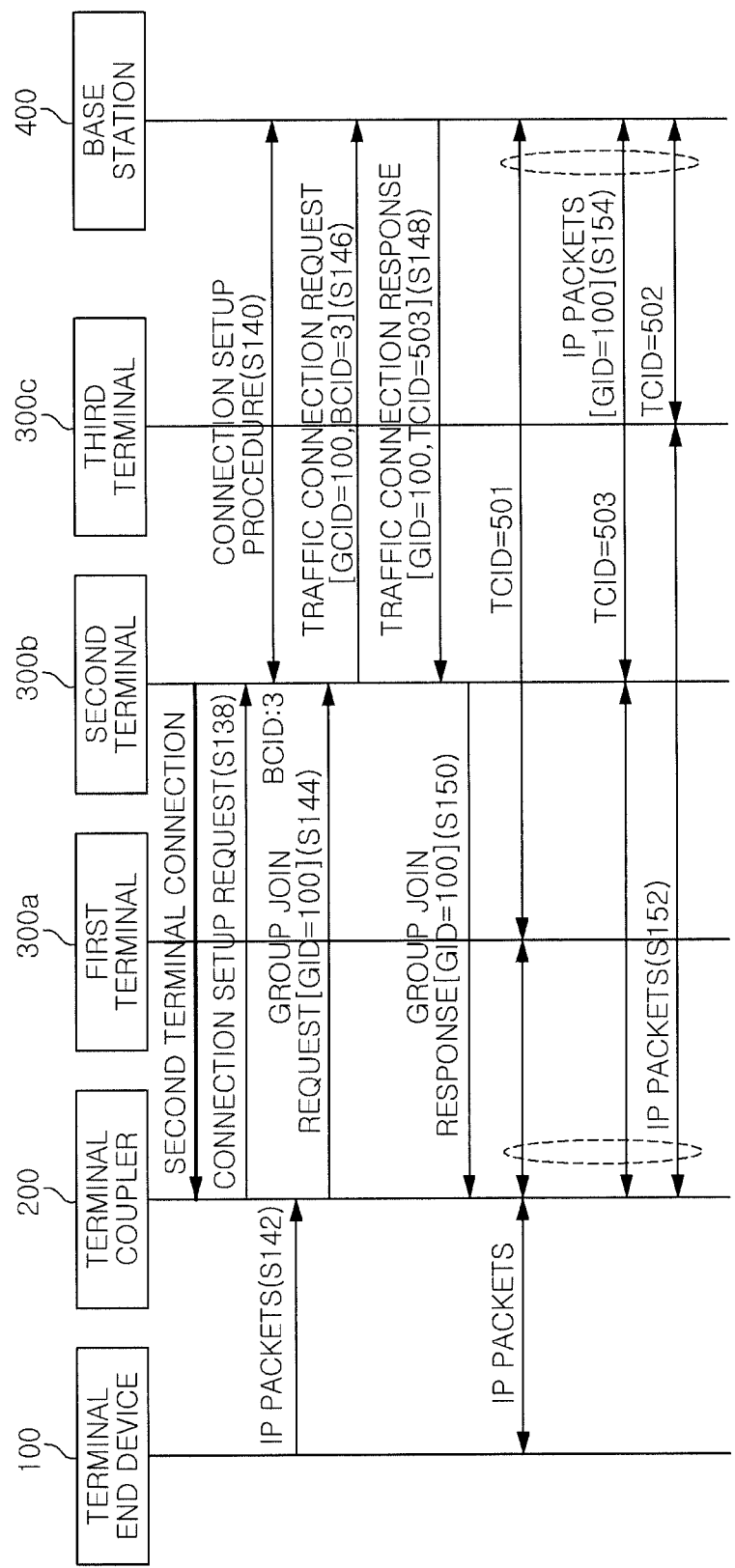

FIGS. 5 and 6 are flow diagrams showing a terminal connection processing method performed by the terminal coupler according to an embodiment of the present invention.

In the description of FIGS. 5 and 6, it is assumed that three terminals are connected to one terminal coupler.

Referring to FIGS. 5 and 6, when a terminal coupler 200 is connected to a terminal end device 100, the terminal end device 100 initializes the terminal coupler 200 using an initialization command at step S100.

Further, when a first terminal 300*a* is connected to the terminal coupler 200, the terminal coupler 200 uses a connection setup (Setup_Connection) request command at step S102, and then enables a basic connection setup procedure to be performed between the first terminal 300*a* and the base station 400 at step S104.

At step S104, the first terminal 300*a* sets up a connection with the base station 400, and is assigned a connection identifier (BCID=1) by the base station 400.

Further, the base station 400 assigns an IP address to the terminal end device 100 by performing a DHCP procedure with the terminal end device 100 at step S106.

Next, when data packets are received from the terminal end device 100 at step S108, the terminal coupler 200 sends a group create request (Create_Group_Req) message to the first terminal 300*a* so as to transfer the data packets to the base station 400 at step S110.

The first terminal 300*a* that received the group create request from the terminal coupler 200 at step S110 sets up a traffic connection with the base station 400 using a Dynamic Service Addition_REQuest (DSA_REQ) message and a Dynamic Service Addition_RESponse (DSA_RES) message.

That is, the first terminal 300*a* adds both the connection identifier (BCID=1) field assigned thereto and a group identifier (GCID=0) field required to create a new group to the DSA_REQ message of IEEE 802.16e, and sends the resulting DSA_REQ message to the base station 400 at step S112.

Then, when the GID included in the DSA_REQ message is GCID=0, the base station 400 recognizes the message as a new group create request, and generates a group identifier (GCID=100) for the relevant terminal.

Further, the base station 400 also assigns a traffic connection identifier (TCID=501) for traffic connection to the first terminal 300*a*. Furthermore, the base station 400 adds a GID) field to the DSA_RES message of IEEE 802.16e, and transmits a GID (GCID=100) generated for the first terminal 300*a* to the first terminal 300*a* using the DSA_RES message at step S114.

After step S114, the first terminal 300*a* sends a response (Group-Res) message to the group create request received from the terminal coupler 200 to the terminal coupler 200 at step S116.

In this case, the first terminal 300*a* includes the group identifier (GCID=100), assigned by the base station 400, in the response message, and then sends the resulting response message at step S116.

After step S116, when IP packets are received from the terminal end device 100, the terminal coupler 200 transmits the IP packets using the set TCID (TCID=501) at step S118.

In this case, when a third terminal 300*c* is newly connected to the terminal coupler 200, the terminal coupler 200 uses a connection setup (Setup_Connection) request command at step S120, and then enables a basic connection setup procedure to be performed between the third terminal 300*c* and the base station 400 at step S122.

The third terminal 300*c* sets up a connection with the base station 400 at step S122, and is assigned a connection identifier (BCID=2) by the base station 400.

Next, when data packets are received from the terminal end device 100 at step S124, the terminal coupler 200 sends a group join request (Join_Group_Req) message to the third terminal 300*c* so as to transfer the data packets to the base station 400.

In this case, when the group join request message is received, the terminal coupler 200 transfers the group identifier (GID=100) assigned at step S116 to the third terminal 300*c* at step S126.

The third terminal 300*c* that received the group join request from the terminal coupler 200 at step S126 sets up a traffic connection with the base station 400 using a Dynamic Service Addition_REQuest (DSA_REQ) message and a Dynamic Service Addition_RESponse (DSA_RES) message.

In this case, the third terminal 300*c* adds the connection identifier (BCID=2) field assigned thereto and the group identifier (GCID=100) to the DSA_REQ message of the IEEE 802.16e and then sends the resulting DSA_REQ message to the base station 400 at step S128.

When the GID of the DSA_REQ message is not 'CID=0', the base station 400 recognizes that the third terminal 300*c* has requested joining in the relevant group from the base station 400.

The base station 400 also assigns the traffic connection identifier (TCID=502) for the third terminal 300*c* to the third terminal 300*c*. Further, the base station 400 adds a GID field to the DSA_RES message of the IEEE 802.16e, and transmits the GID (GCID=100) to the third terminal 300*c* using the DSA_RES message at step S130.

After step S130, the third terminal 300*c* sends a response (Group_Res) message to the group join request received from the terminal coupler 200 to the terminal coupler 200. In this case, the third terminal 300*c* includes the GID (GCID=100) assigned by the base station 400 in the response message, and then sends the resulting response message at step S132.

After step S132, when IP packets are received from the terminal end device 100, the terminal coupler 200 transmits the IP packets to the base station 400 using one or more of the TCID=501 connection of the first terminal 300*a* and the TCID=502 connection of the third terminal 300*c* which have been set up at steps S134 and S136. These steps are equally applied to a downlink.

Meanwhile, when the second terminal 300*b* is connected to the terminal coupler 200, it is added to the group 'GID=100' of the base station 400 using the same procedure as that of the third terminal 300c at steps S138 to S150.

In this case, the base station 400 recognizes that terminals with BCID=1, BCID=2, and BCID=3 are included in the group with 'GID=100' and that TCID=501, TCID=502, and TCID=503 connections of the terminals have been set up with the same terminal coupler 200 and must be independently processed.

Thereafter, when IP packets, are received from the terminal end device 100, the terminal coupler 200 transmits the IP packets to the base station 400 using one or more of the TCD=501 connection of the first terminal 300a, the TCID=502 connection of the third terminal 300c and the TCID=503 connection of the second terminal 300b at steps S152 and S154. These steps are equally applied to a downlink.

Figure 7:
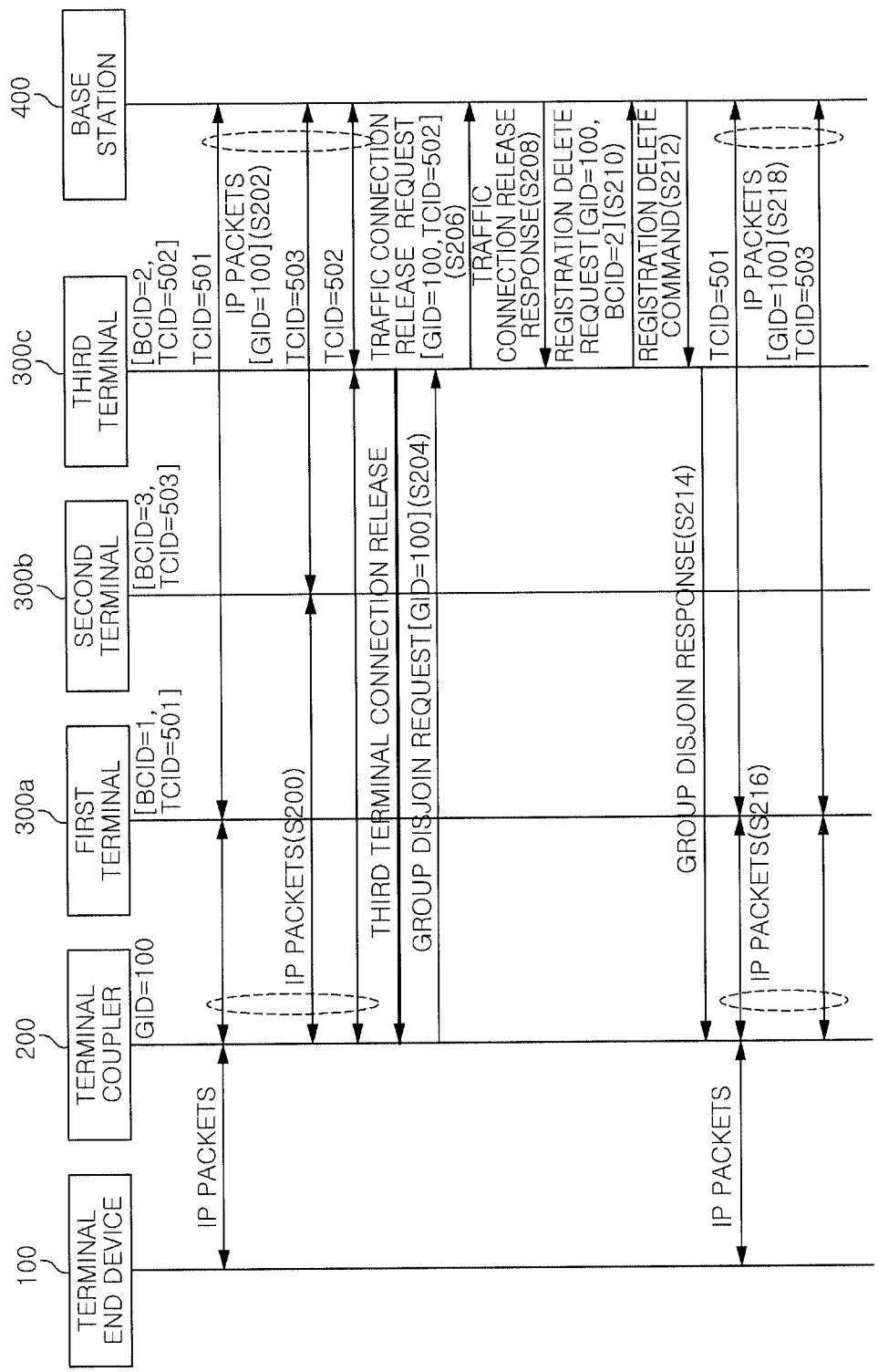
FIGS. 7 and 8 are flow diagrams showing a terminal connection release processing method performed by the terminal coupler according to an embodiment of the present invention.
Figure 8:
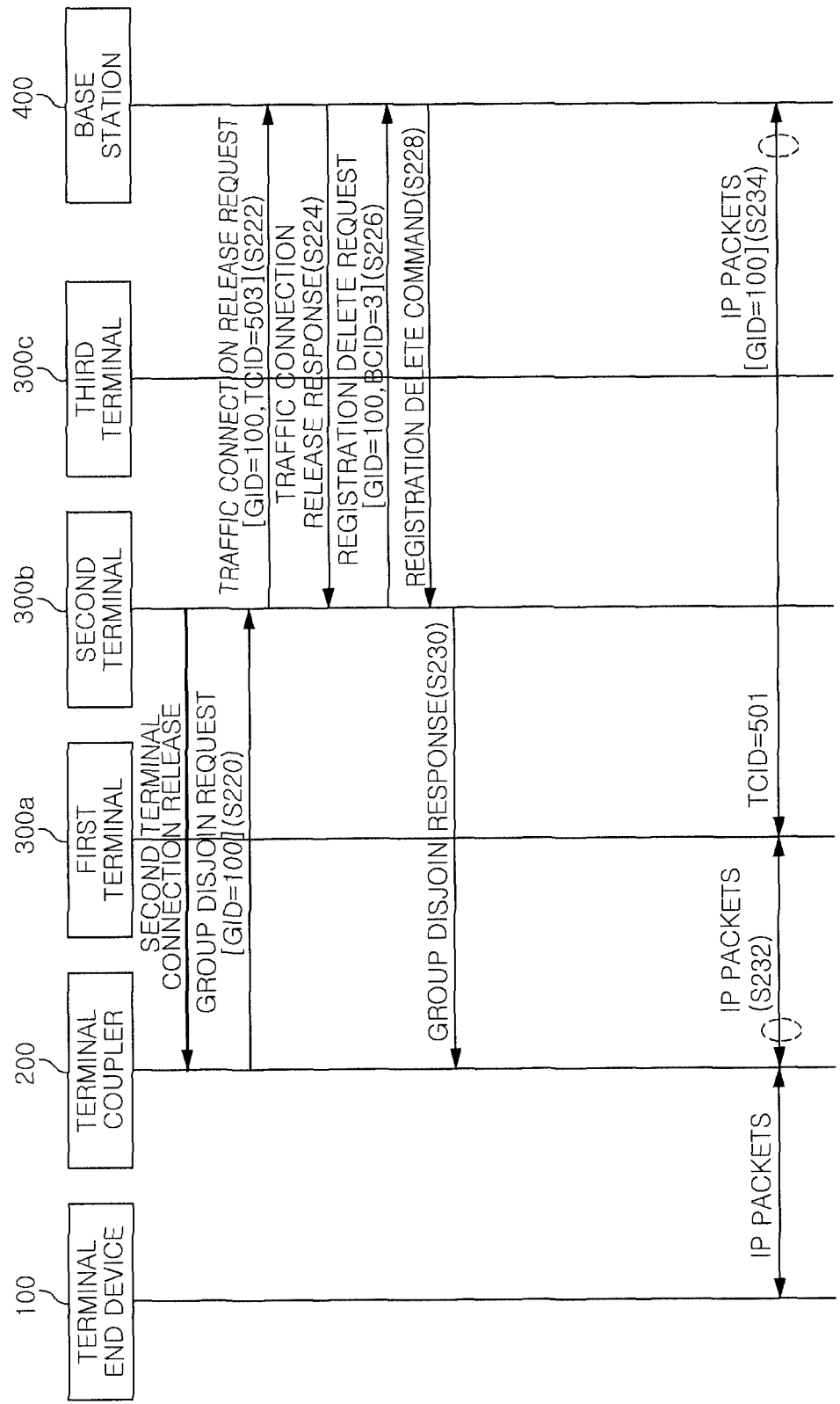

FIGS. 7 and 8 are flow diagrams showing a terminal connection release processing method performed by the terminal coupler according to an embodiment of the present invention.

In the description of FIGS. 7 and 8, it is assumed that a first terminal (BCID=1, TCID=501), a second terminal (BCID=3, TCID=503), and a third terminal (BCID=2, TCID=502) are connected to a terminal coupler 200 and enable packet communication, and that the first, second and third terminals belong to the same group (GID=100) at steps S200 and S202.

Referring to FIGS. 7 and 8, when a connection release request is received from the third terminal 300c, the terminal coupler 200 requests the third terminal 300c to disjoin from the group at step S204.

Then, the third terminal 300c releases a traffic connection (TCID=502) with the base station 400 using a DSD_REQ message and a DSD_RES message at steps S206 and S208. In this case, a group identifier (GID=100) field is added to the DSD_REQ message of the IEEE 802.16e, and thus the traffic connection (TCID=502) can be released from the relevant group.

Further, the registration of the third terminal 300c is deleted from the relevant group using a De-registration_REQuest (DREG-REQ) message and a De-registration_Command (DREG-CMD) message at steps S208 to S214. In this case, the third terminal 300c can be deleted from the relevant group by adding a connection identifier (BCID=2) field to the DREG-REQ message of the IEEE 802.16e.

Thereafter, the terminal coupler 200 and the base station 400 transmit IP packets using the TCID=501 connection of the first terminal 300a and the TCD=503 connection of the second terminal 300b at steps S216 and S218. These steps are equally applied to a downlink.

Next, when a connection release request is received from the second terminal 300b, the terminal coupler 200 requests the second terminal 300b to disjoin from the relevant group at step S220.

Then, the second terminal 300b releases a traffic connection (TCID=503) with the base station 400 using a DSD_REQ message and a DSD_RES message at steps S222 and S224. In this case, the traffic connection (TCID=503) can be released from the relevant group by adding a group identifier (GID=100) field to the DSD_REQ message of the IEEE 802.16e.

Further, the registration of the second terminal 300b is deleted from the relevant group using a De-registration_REQuest (DREG-REQ) message and a De-registration_Command (DREG-CMD) message at steps S226 to S230. In this case, the registration of the second terminal 300b can be deleted from the relevant group by adding a connection identifier (BCID=3) field to the DREG-REQ message of the IEEE 802.16e.

Thereafter, the terminal coupler 200 and the base station 400 transmit IP packets using the TCID=501 connection of the first terminal 300a.

Figure 9:
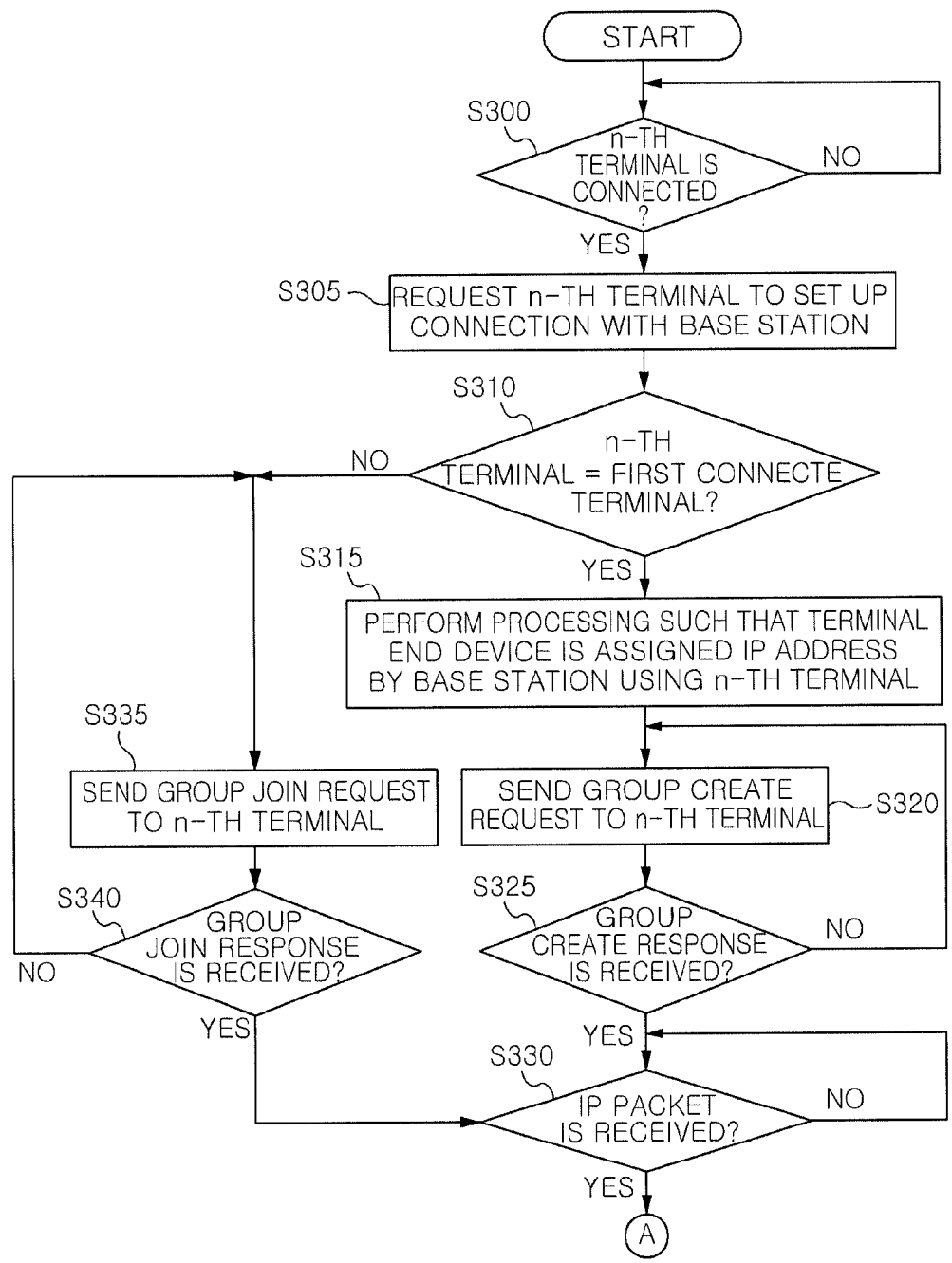
FIGS. 9 and 10 are flowcharts showing a communication method performed by the terminal coupler according to an embodiment of the present invention.
Figure 10:
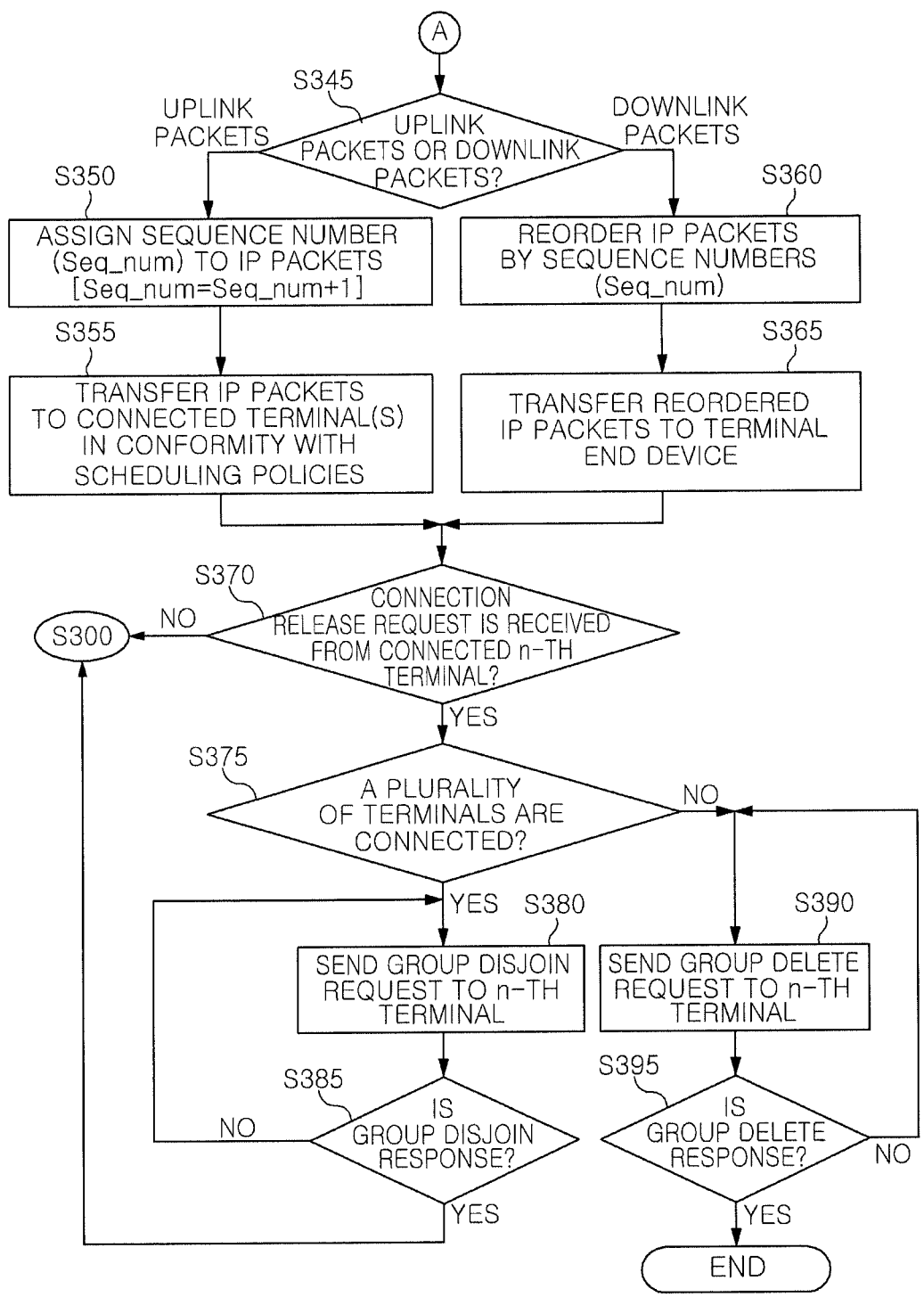

FIGS. 9 and 10 are flowcharts showing a communication method performed by the terminal coupler according to an embodiment of the present invention.

Referring to FIGS. 9 and 10, the terminal coupler according to the present invention determines whether a new n-th terminal has been connected to the terminal coupler at step S300.

If it is determined at step S300 that the new terminal has been connected, the terminal coupler requests the newly connected n-th terminal to perform a basic connection setup procedure with the base station by sending a connection setup (Setup_Connection) request message to the newly connected n-th terminal at step S305. In response to the request, the n-th terminal performs a series of connection setup procedures with the base station, and is assigned a unique connection identifier (BCID) by the base station.

Next, the terminal coupler determines whether the newly connected n-th terminal is a terminal connected first to the terminal coupler at step S310.

If it is determined at step S310 that the n-th terminal is the terminal connected first to the terminal coupler, the terminal coupler performs processing so that a terminal end device performs a DHCP procedure with the base station and is assigned an IP address by the base station at step S315. This address is shared among all terminals that will be connected later to the terminal coupler.

Further, the terminal coupler requests the n-th terminal to create a new group.

That is, the terminal coupler transfers a group create request (Create_Group_Req) message to the n-th terminal, and is assigned a group identifier (GID) by the base station through the n-th terminal at steps S320 and S325. In this case, the n-th terminal is assigned a traffic connection identifier (TCID) and a group identifier (GID) by the base station using a DSA-REQ message and a DSA-RES message.

The terminal coupler assigned the GID by the base station at step S325 determines whether IP packets have been received from the terminal end device or the base station at step S330.

Meanwhile, if it is determined at step S310 that the n-th terminal is not the terminal connected first to the terminal coupler, the terminal coupler sends a group join request (Join_Group_Req) message to the n-th terminal at step S335. In this case, when transferring the group join request message to the n-th terminal, the terminal coupler includes a group identifier (GID), previously assigned by the base station using a terminal that was connected first to the terminal coupler, in the group join request message and transfers a resulting group join request message to the n-th terminal.

The n-th terminal is assigned a TCID by the base station using a DSA-REQ message and a DSA-RES message, and the base station includes the connection identifier (BCID) and the traffic connection identifier (TCID) of the n-th terminal in a relevant group.

Thereafter, when the terminal end device receives a response to the group join request from the n-th terminal, the terminal coupler determines whether IP packets have been received from the terminal end device or the base station at step S330.

If it is determined at step S330 that the IP packets have been received, the terminal coupler determines whether the received IP packets are uplink packets that are transmitted from the terminal end device to the base station, or downlink packets that are transmitted from the base station to the terminal end device at step S345.

If it is determined at step S345 that the IP packets are uplink packets, the terminal coupler assigns sequence numbers seq_num to the IP packets, and transfers the IP packets to the terminal(s) connected to the terminal coupler in conformity with preset scheduling policies. Therefore, the individual terminals transmit the packets to the base station according to a preset transmission procedure at steps S350 and S355.

If it is determined at step S345 that the IP packets are downlink packets, the terminal coupler reorders the IP packets by the sequence numbers seq_num included in the received IP packets, and transmits the reordered IP packets to the terminal end device at steps S360 and S365.

Next, the terminal coupler determines that a connection release request has been received from the connected n-th terminal at step S370.

If it is determined at step S370 that a connection release request has been received from the n-th terminal, the terminal coupler determines whether a plurality of terminals is currently being connected to the terminal coupler at step S375.

If it is determined at step S375 that the plurality of terminals is currently being connected to the terminal coupler, the terminal coupler performs processing such that it requests the n-th terminal to disjoin from the group and the n-th terminal is disjoined from the group at steps S380 and S385. Otherwise, the terminal coupler performs processing such that it requests the n-th terminal to delete the group, and such that the group can be deleted while the n-th terminal is disjoined from the group at steps S390 and S395.

In more detail, when the plurality of terminals is currently being connected to the terminal coupler, the terminal coupler sends a group disjoin (Disjoin_Req) command to the n-th terminal. Then, the n-th terminal releases a traffic connection that was set up between the n-th terminal and the base station using a DSD_REQ and DSD_RES procedure, and disjoins from the relevant group. In contrast, when a plurality of terminals is not currently being connected to the terminal coupler (that is, the n-th terminal is the last terminal), the terminal coupler transfers a group delete (Delete_Group) command to the n-th terminal. Then, the n-th terminal performs processing such that a traffic connection set up between the n-th terminal and the base station is released using a DSD_REQ and DSD_RES procedure while the relevant group is deleted.

Figure 11:
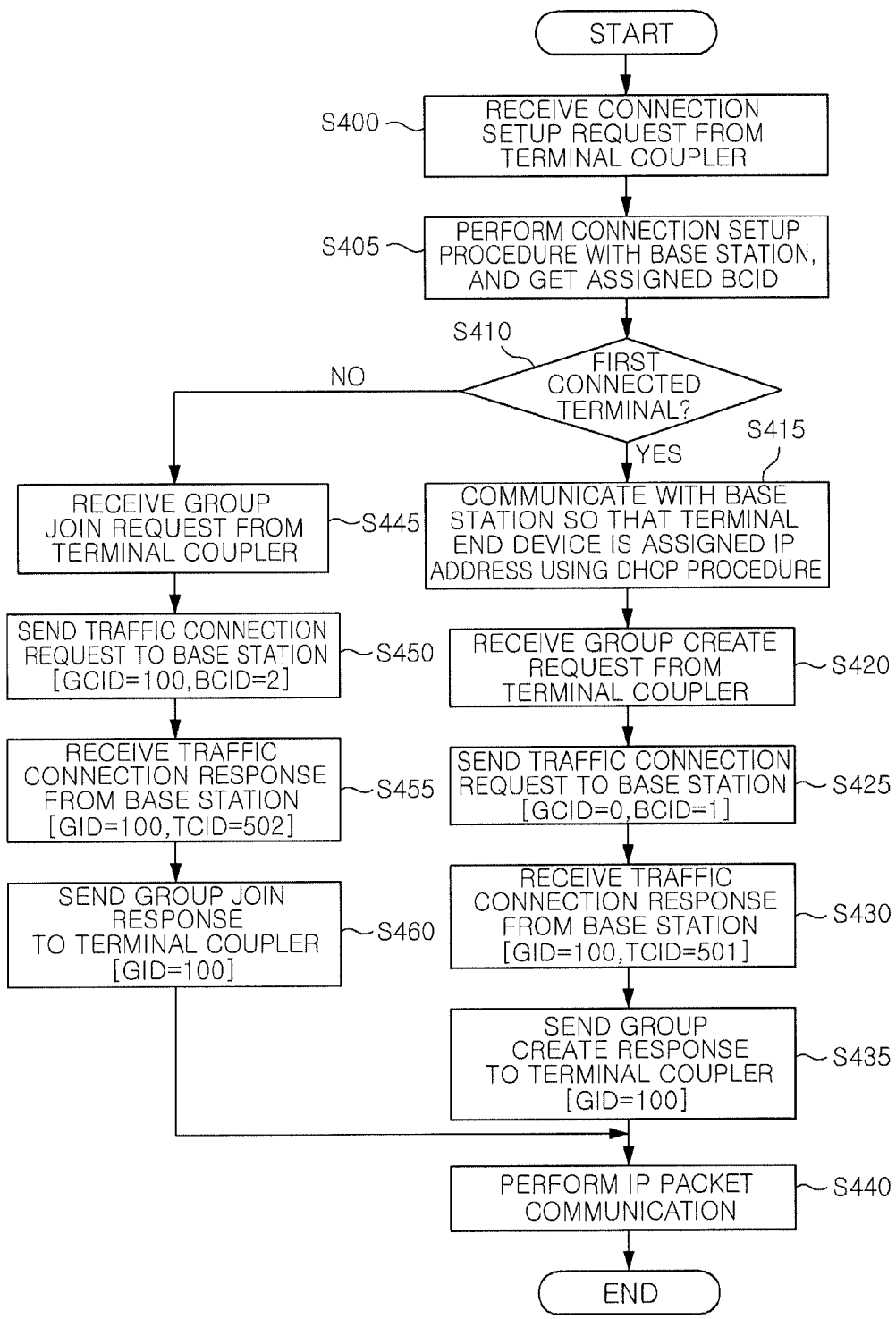
FIGS. 11 and 12 are flowcharts showing a terminal coupler connection processing method performed by a terminal according to an embodiment of the present invention.

FIG. 11 is a diagram showing a terminal coupler connection processing method performed by a terminal according to an embodiment of the present invention.

Referring to FIG. 11, when the terminal is connected to the terminal coupler and receives a connection setup (Setup_Connection) request message from the terminal coupler at step S400, the terminal performs a basic connection setup procedure with the base station, and is assigned a unique connection identifier (BCID) by the base station at step S405.

Further, when the relevant terminal is the terminal connected first to the terminal coupler, the terminal performs processing such that a terminal end device performs a DHCP procedure with the base station and can be assigned an IP address by the base station at the request of the terminal coupler at step S415.

Further, when a group create request (Create_Group_Req) message is received from the terminal coupler at step S420, the terminal is assigned a traffic connection identifier (TCID) and a group identifier (GID) by the basic station using a DSA-REQ message and a DSA-RES message at steps S425 and S430. Further, the terminal includes the GID, assigned at step S430 by the base station, in a group create response message, and transfers the resulting group create response message to the terminal coupler, thus notifying the terminal coupler that a new group has been successfully created at step S435.

Meanwhile, when the terminal is not the terminal connected first to the terminal coupler, the terminal receives a group join request (Join_Group_Req) message from the terminal coupler at step S445. The terminal having received the group join request message from the terminal coupler is assigned a traffic connection identifier (TCIP) by the base station using a DSA-REQ message and a DSA-RES message at steps S450 and S455. In this case, the base station includes the connection identifier (BCID) and the traffic connection identifier (TCID) of the terminal in the group. Further, the terminal notifies the terminal coupler that the terminal has successfully joined in the relevant group by sending a response message to the group join request, received from the terminal coupler, to the terminal coupler at step S460.

Thereafter, the terminal end device and the base station are connected to the single terminal coupler and perform IP packet communication through the terminal(s) forming the same group at step S440.

Figure 12:
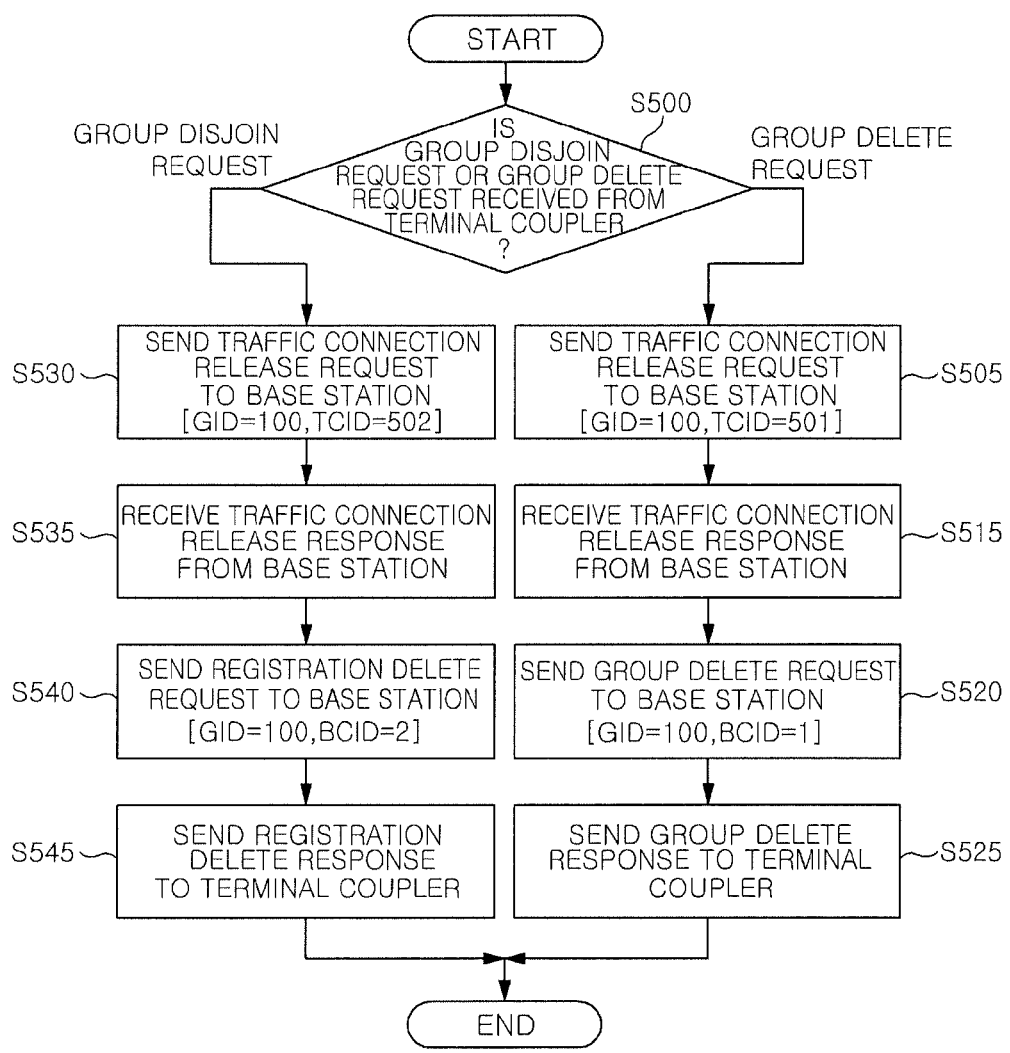

FIG. 12 is a flowchart showing a terminal coupler connection release processing method performed by the terminal according to an embodiment of the present invention.

In FIG. 12, it is assumed that only the terminal (GID=100, BCID=1, and TCID=501) which received the group delete request is currently being connected to the terminal coupler, and that a terminal (GID=100, BCID=2, TCID=501) which received a group disjoin request is currently being connected to the terminal coupler together with other terminals.

Referring to FIG. 12, the terminal determines whether a group disjoin request or a group delete request has been received from the terminal coupler at step S500.

If it is determined at step S500 that the group delete request has been received from the terminal coupler, the terminal releases a traffic connection (TCID=501) with the base station using a DSD_REQ message and a DSD_RES message at steps S505 and S515. In this case, the terminal can release the traffic connection (TCID=501) from the relevant group by adding a group identifier (GID=100) field to the DSD_REQ message of the IEEE 802.16e. Further, the terminal performs processing such that it requests the base station to delete the relevant group and then the group is deleted.

Meanwhile, if it is determined at step S500 that a group disjoin request has been received from the terminal coupler, the terminal releases a traffic connection (TCD=502) with the base station using a DSD_REQ message and a DSD_RES message at steps S530 and S535. In this case, the terminal can release the traffic connection (TCID=502) from the relevant group by adding a group identifier (GID=100) field to the DSD_REQ message of the IEEE 802.16e.

Further, the registration of the terminal from the group (GID=100) is deleted using a DREG-REQ message and a DREG-CMD message at step S540. In this case, the terminal performs processing such that the registration of the terminal from the group is deleted by adding a CID (BCID=2) field to the DREG-REQ message of the IEEE 802.16e.

As described above, according to the present invention, with regard to a high-speed/high-capacity data service that is difficult to be supported by one communication terminal due to factors such as the status of wireless channels or the amount of data, a plurality of communication terminals is connected to one terminal coupler, and thus a user can easily be provided with that service.

That is, the present invention can provide a stable data service to an area in which the status of wireless channels is not good, and can provide a high-capacity multimedia service, which cannot be supported by a single terminal, at high speed to an area in which the status of wireless channels is good.

Further, the present invention is advantageous in that even a terminal equipped with no wireless communication means can be stably provided with a desired service via wireless communication by using a terminal coupler according to the present invention.

As described above, optimal embodiments have been shown and described in the drawings and the present specification. Although specific terminals have been used, these are only intended to describe the present invention, and are not intended to restrict the meanings of terms or limit the scope of the present invention. Therefore, those skilled in the art will appreciate that various modifications, additions and substitutions are possible, without departing from the scope and spirit of the invention. Therefore, the scope of the present invention should be defined by the technical spirit of the accompanying claims.

What is claimed is:

1. A terminal coupler for a wireless communication, comprising:
    a sequence number assignment unit for sequentially assigning sequence numbers to data packets received from a terminal end device, and performing processing such that the data packets with the sequence numbers assigned thereto are individually transferred to a plurality of communication terminals belonging to a same group in conformity with preset scheduling policies;
    a packet transfer unit for reordering the data packets, received from the plurality of communication terminals belonging to the same group by sequence numbers included in the data packets, and transferring the reordered data packets to the terminal end device;
    a communication unit for setting up a plurality of communication channels between the terminal end device and a base station using the plurality of communication terminals; and
    a control unit for determining whether a new communication terminal isthe first to connect to the terminal coupler in a relevant group after the connection between the new communication terminal and the base station has been set up,
    wherein the communication unit is configured such that, when the new communication terminal is connected to the terminal coupler, the communication unit requests the new communication terminal to set up a connection with the base station, thus enabling a connection between the new communication terminal and the base station to be set up and the control unit performs processing such that if it is determined that the new communication terminal is not the first to connect to the terminal coupler in the relevant group, a group join request message including a group identifier of the relevant group is sent to the new communication terminal;
    and if it is determined that the new communication terminal is the first to connect to the terminal coupler, the terminal end device is assigned an Internet Protocol (IP) address by the base station via the new communication terminal.

2. A communication method performed by a terminal coupler, comprising:
    sequentially assigning sequence numbers to data packets received from a terminal end device;
    individually transferring the data packets with the sequence numbers assigned thereto to a plurality of communication terminals belonging to a same group in conformity with present scheduling policies;
    reordering data packets, received from the plurality of communication terminals belonging to the same group, by sequence numbers and transferring the reordered data packets to the terminal end device; and
    setting up a plurality of communication channels between the terminal end device and a base station via the plurality of communication terminals,
    wherein the setting up the communication channels comprises:
    when a new communication terminal is connected to the terminal coupler, requesting the new communication terminal to set up a connection with the base station, thus enabling a connection between the new communication terminal and the base station to be set up;
    after the connection between the new communication terminal and the base station has been set up, determining whether the new communication terminal is the first to connect to the terminal coupler and if it is determined that the new communication terminal is not the first to connect to the terminal coupler in a relevant group, sending a group join request message, which includes an identifier of the relevant group, to the new communication terminal;
    and if it is determined that the new communication terminal is the first to connect to the terminal coupler in the relevant group, performing processing such that the terminal end device is assigned an internet protocol (IP) address by the base station using the new communication terminal.

* * * * *